US005122815A

United States Patent [19]

Kondo

[11] Patent Number: 5,122,815

[45] Date of Patent: Jun. 16, 1992

[54] MAGNETIC RECORDING DEVICE

[75] Inventor: Nobuhiro Kondo, Tokyo, Japan

[73] Assignee: Seikosha Co., Ltd., Tokyo, Japan

[21] Appl. No.: 620,188

[22] Filed: Nov. 29, 1990

[30] Foreign Application Priority Data

Nov. 30, 1989 [JP] Japan ................................ 1-311835

[51] Int. Cl.[5] ................................................ G11B 9/00

[52] U.S. Cl. .................................... 346/74.2; 355/251

[58] Field of Search ................ 346/74.2; 355/251, 256

[56] References Cited

U.S. PATENT DOCUMENTS

| | | | |
|---|---|---|---|
| 3,576,623 | 4/1971 | Snelling | 355/245 |
| 3,741,760 | 6/1973 | Snelling | 355/245 |
| 3,857,549 | 12/1974 | Snelling | 355/245 |
| 4,206,467 | 6/1990 | Fujii | 346/140 R |
| 4,315,267 | 2/1982 | Sonoda et al. | 346/74.2 X |
| 4,734,708 | 3/1988 | Saitoh et al. | 346/74.2 X |
| 5,031,570 | 7/1991 | Hays et al. | 355/251 |
| 5,034,773 | 7/1991 | Nimura et al. | 355/251 |
| 5,036,364 | 7/1991 | Murasawa | 355/251 |

*Primary Examiner*—Benjamin R. Fuller
*Assistant Examiner*—Randy W. Gibson
*Attorney, Agent, or Firm*—Jordan and Hamburg

[57] ABSTRACT

A magnetic recording device includes a magnetic fluid having a surface, a body having a magnetic surface, an arrangement for forming a magnetic image on the magnetic surface, and an arrangement for moving the magnetic image with respect to the surface of the fluid, to attract the magnetic fluid thereto. A magnetic arrangement is provided to locally raise the surface of the fluid, i.e., to heap it up, so that the magnetic image only attracts magnetic fluid from the raised region thereof. The magnetic arrangement may be a permanent magnet or an electromagnet.

1 Claim, 3 Drawing Sheets

MAGNETIC RECORDING DEVICE

FIELD OF THE INVENTION

The present invention relates to a magnetic recording device using a magnetic fluid as a developing agent.

BACKGROUND OF THE INVENTION

One magnetic recording method converts a magnetic image formed on a magnetic layer into a visible image with the use of a magnetic material such as a magnetic toner or the like. Since the magnetic image has a high resolution, this magnetic recording method has promise as a method for forming a fine pattern.

When a magnetic toner was used as the magnetic material, however, the formation of a fine pattern suitable for the magnetic image could not be realized, since the particle diameter of the magnetic toner is more than 10 micrometers.

In order to solve the above-described problem, it has been proposed to provide a magnetic recording device using a magnetic fluid as a magnetic material. (For example, see official publication of the Japanese Patent Application Laid-Open No. 48063/1985).

The magnetic recording device disclosed in the official publication of the Japanese Patent Application Laid-Open No. 48063/1985 immerses the surface of a magnetic drum formed with a magnetic image in a magnetic fluid, and the magnetic image is successively converted into a visual image while rotating the magnetic drum.

In the above-described conventional magnetic recording device, due to the flaws and pollution of the surface of the magnetic drum, the magnetic fluid adheres to the part other than the magnetic image part, and deterioration of the recording quality results.

SUMMARY OF THE INVENTION

The object of the present invention is to prevent the adhesion of the magnetic fluid to the parts other than the magnetic image part, and to improve the recording quality.

BRIEF DESCRIPTION OF THE DRAWINGS

In order that the invention may be more clearly understood, it will now be disclosed in greater detail with reference to the accompanying drawings, wherein.

DESCRIPTION OF THE PREFERRED EMBODIMENTS

Figure 1:
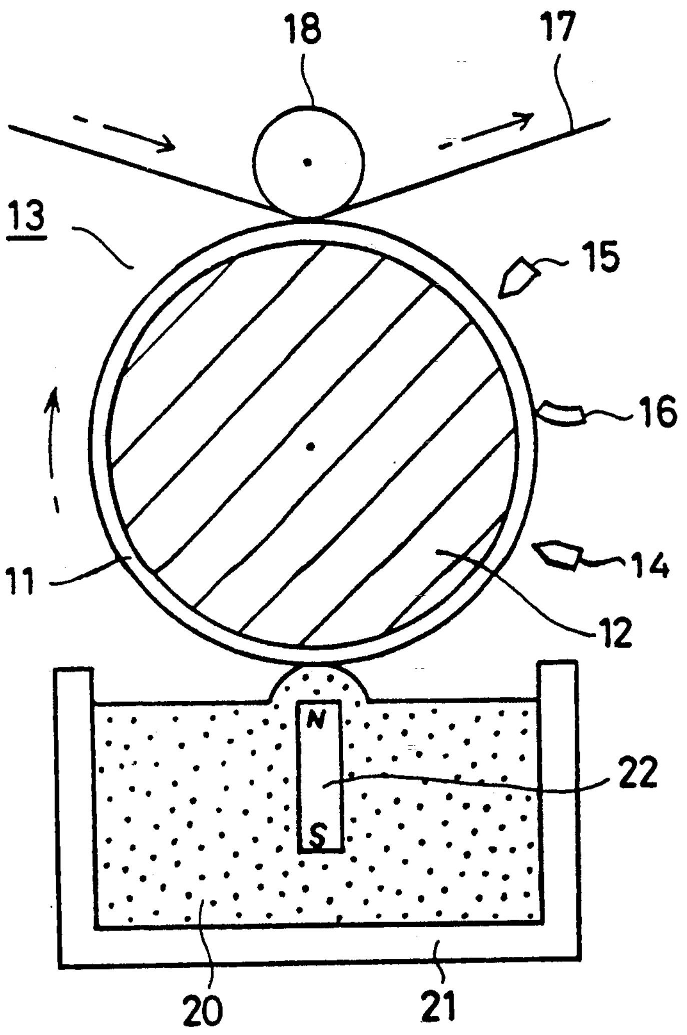
FIG. 1 is an explanatory diagram for showing one embodiment of the present invention.

Identical reference numerals in the drawings refer to the same elements.

A description will first be given of the respective constitutional elements of the device of the invention illustrated in FIG. 1.

Numeral 11 denotes a magnetic layer formed by dispersing powder of $Fe_2O_3$, $CrO_2$, Fe (iron), Ni (nickel), Co (cobalt), etc. in a resin. Although it is not shown in the figure, a protective layer may be provided on the surface of this magnetic layer.

Numeral 12 denotes a substrate in the form of a circular pillow or cylinder. A magnetic body 11 is formed on the surface of the substrate, and the substrate rotates in the direction of the adjacent arrow.

The magnetic drum 13 forms the movable body, and is comprised of the above-described magnetic layer 11 and the substrate 12.

Numeral 14 denotes a write head comprising the magnetic image forming means, for writing a magnetic pattern to form a magnetic image.

Numeral 15 denotes a magnetic erasing head for erasing the magnetic image.

Numeral 16 denotes a cleaning blade for removing the magnetic fluid (described later) and the like adhered to the surface of the movable body 13, for cleaning the surface of the movable body.

Numeral 17 denotes a recording medium, such as a recording paper or the like.

Numeral 18 denotes a transcription roller for successively transferring the developed pattern made by the magnetic fluid and formed in correspondence with the magnetic image of the magnetic layer 11 to the recording medium 17.

Numeral 20 denotes a magnetic fluid formed by suspending a ferromagnetic powder of about 10 nanometer particle size in water or in an organic solvent. This magnetic fluid adheres to the upper part of the magnetic image by magnetic force and transforms the magnetic image into a visible image.

Numeral 21 denotes a storing means, which is a vessel for storing the magnetic fluid 20.

Numeral 22 denotes a permanent magnet comprising a magnetic field generating means, and is mounted in the magnetic fluid 20. Since the magnetic field concentrates towards the pole (N pole in FIG. 1) of this permanent magnet 22, the magnet fluid 20 is strongly attracted to the N pole. As a result, as shown in FIG. 1, the surface of the magnetic fluid 20 in the vicinity of the N pole is locally raised or heaped up. The surface of the magnetic drum 13 and the surface of the magnetic fluid 20 are adjusted to provide contact therebetween only at this heaped up part. Therefore, when the permanent magnet 22 has been removed, the surface of the magnetic drum 13 and the surface of the magnetic fluid 20 do not contact one another.

An explanation will now be given of the operation of the present embodiment.

A predetermined magnetic pattern is successively written in the magnetic layer 11 by the write head 14, and a magnetic image is formed thereon. When the magnetic drum 13 is rotated, and the magnetic image part of the magnetic drum contacts locally the raised or heaped part of the magnetic fluid 20, the magnetic fluid adheres only to the magnetic image part, and development is carried out. In parts of the drum other than the magnetic image part, since the magnetic fluid 20 is attracted by the magnetic field of the permanent magnet 22, the magnetic fluid does not adhere to the surface of the magnetic drum 13. The developed pattern of the magnetic fluid adhered to the surface of the magnetic drum 13 is transferred to the recording medium 17 by the transcription roller 18. After finishing the transfer, the magnetic image is erased with the magnetic erasing head 15. When the magnetic erasing action has been finished, the magnetic fluid and the like adhered to the surface of the magnetic drum 13 is removed by the cleaning blade 16, and the surface of the magnetic drum 13 is cleaned.

In the manner described above, a series of cycles of the magnetic recording are finished.

When the distance between the magnetic drum 13 and the permanent magnet 22 or the arrangement angle of both members are changed, the attraction power of the magnetic fluid 20 can be changed. As a result, the amount of the magnetic fluid 20 adhering to the magnetic image part of the magnetic drum 13 can be changed, and the recording concentration can be controlled.

An explanation will now be given of another embodiment of the magnetic field generating means, with reference to FIGS. 2(A) and 2(B).

Figure 2:
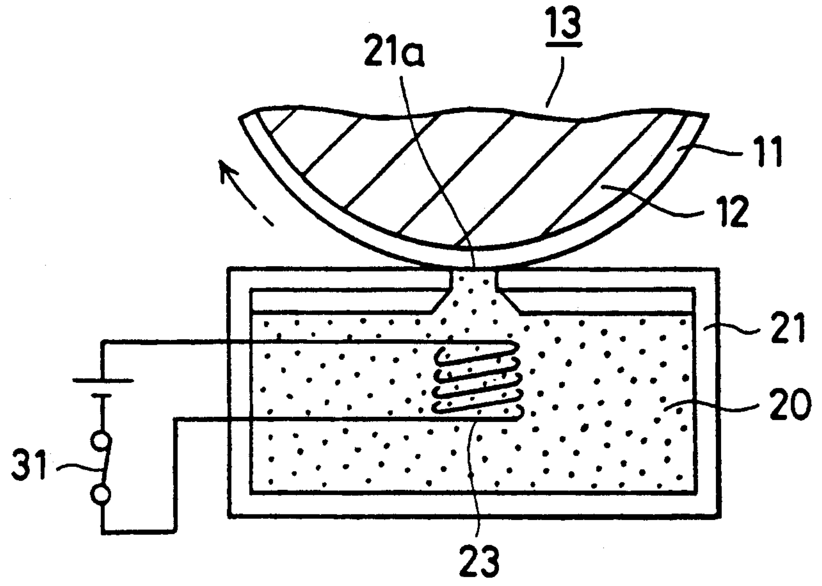
FIGS. 2(A), 2(B) and 3 are explanatory diagrams showing second and third embodiments of the magnetic field generating means.
Figure 2:
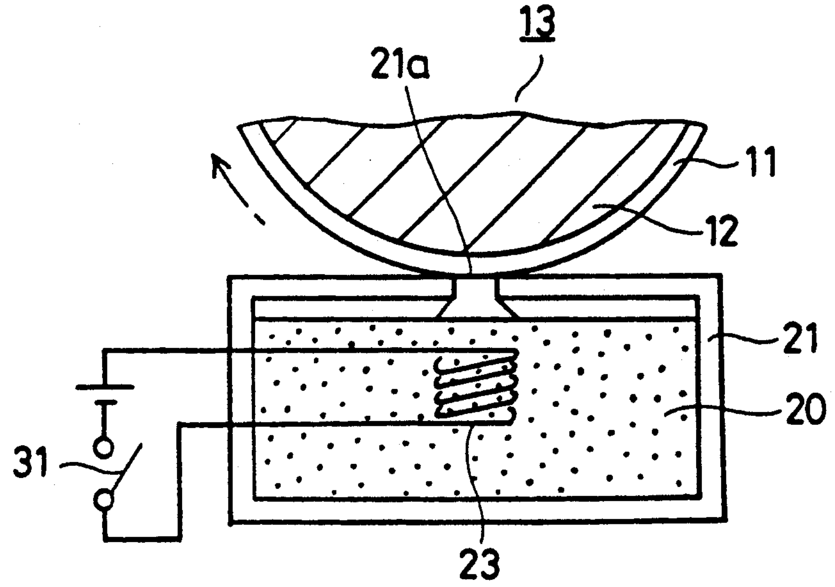

The examples shown in FIGS. 2(A) and 2(B) use a coil 23 as a magnetic field generating means.

In the present embodiment, although the upper surface of the storing vessel 20 is covered with an external wall except for the open port 21*a,* in order to avoid the mixing of dust into the magnetic fluid 20 and the evaporation of the solvent of the magnetic fluid 20, it is not necessarily required to provide such an external wall within the scope of the invention.

At the time of the development, as shown in FIG. 2(A), the switch 31 is turned on, and electric current is passed to the coil 23. Since the magnetic field concentrates at the terminal part of the coil 23, due to the same principle as that in the embodiment shown in FIG. 1, the surface of the magnetic fluid 20 is heaped up in the vicinity of the terminal part of the coil 23. Since the open port 21*a* is located to be aligned with the terminal part of the coil 23, the heaped up part of the magnetic fluid 20 contacts the surface of the magnetic drum 13 through the open port 21*a,* and development is carried out.

When the development is not to be carried out, the switch 31 is opened as shown in FIG. 2(B), to stop current flow to the coil 23. Since a magnetic field is not generated by the coil 23, the surface of the magnetic fluid 20 is not heaped up. Therefore, the magnetic fluid 20 does not contact the surface of the magnetic drum 13.

When the magnetic field generated in the coil 23 is increased or decreased by increasing or decreasing the current flowing in the coil 23, the attracting force for the magnetic fluid 20 can be changed. AS a result, the amount of the magnetic fluid 20 adhering to the magnetic image part of the magnetic drum 3 can be changed, and the recording concentration can be controlled.

An explanation will now be given of another embodiment of the magnetic field generating means, with reference to FIG. 3.

Figure 3:
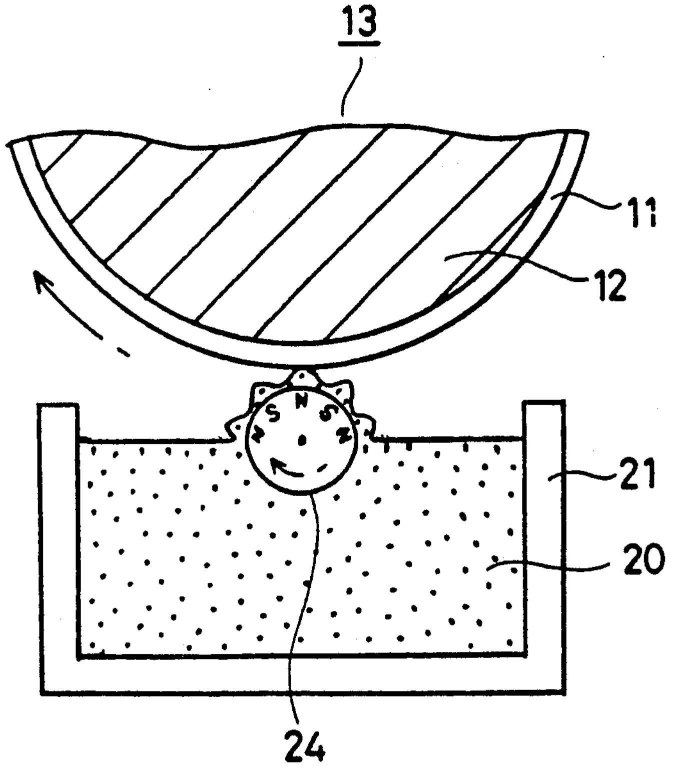

The example shown in FIG. 3 uses a magnet roller as a magnetic field generating means.

The magnet roller 24 is mounted in the vicinity of the surface of the magnetic fluid 20, and rotates in the direction of the arrow therein. N poles and S poles are alternatively arranged in the circular circumferential direction of the magnet roller 24, as shown in FIG. 3. Since the magnetic field concentrates to the N pole and S pole, due to the same principle as that shown in the embodiment shown in FIG. 1, the surface of the magnetic fluid 20 is heaped up in alignment with each pole. The surface of the magnetic drum 13 and the surface of the magnet fluid 20 are adjusted to be contacted only at this heaped up part. In such a manner as described above, since the development is carried out by use of the magnetic fluid adhered to the surface of the magnet roller 24, the development can be carried out under predetermined conditions.

In the present invention, since the development is carried out by letting the surface of the magnetic fluid be heaped up, and by letting the heaped up part of the magnetic fluid contact the surface of the magnetic drum, the adhesion of the magnetic fluid to parts other than the magnetic image can be prevented, and the improvement of the recording quality can be devised.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

What is claimed is:

1. In a magnetic recording device comprising a body having a magnetic layer, means for forming a magnetic image on said magnetic layer, a magnetic fluid having a surface, and means for magnetically locally raising a portion of said magnetic fluid at said surface and for providing direct contact between said magnetic layer and said raised portion such that said magnetic fluid adheres to said magnetic image at said raised portion, said means for magnetically locally raising a portion of said fluid comprising a coil in said fluid and means for energizing said coil, said means for energizing comprising a source of current and switch means for applying said current to said coil, a container for said magnetic fluid, said container having a cover with a port aligned with the field of said means for magnetically locally raising a portion of said fluid, whereby said fluid is locally raised only in said port when said current is applied to said coil by said switch means.

* * * * *